United States Patent [19]

Morrison

[11] Patent Number: 4,467,640

[45] Date of Patent: Aug. 28, 1984

[54] GAS TURBINE ENGINE POWER AVAILABILITY MEASUREMENT

[75] Inventor: Terry Morrison, Vernon, Conn.

[73] Assignee: Chandler Evans, Inc., West Hartford, Conn.

[21] Appl. No.: 382,114

[22] Filed: May 26, 1982

[51] Int. Cl.$^3$ .......................................... G01M 15/00
[52] U.S. Cl. ................................................ 73/117.3
[58] Field of Search ................... 73/117.3, 116, 862.33; 364/551

[56] References Cited

U.S. PATENT DOCUMENTS 3,181,353  5/1965  Brahm et al. ...................... 73/117.3
3,754,440  8/1973  Edgerton et al. ............... 364/551 X Primary Examiner—Jerry W. Myracle

[57] ABSTRACT

The power available from a gas turbine engine is accurately determined by correcting predicted torque and gas generator speed for variations from normal of engine performance. The correction function is adaptively updated on-line by comparing actual and predicted values of torque and speed, storing any differences and summing the stored differences with the predicted values during the determination of power available.

9 Claims, 2 Drawing Figures

GAS TURBINE ENGINE POWER AVAILABILITY MEASUREMENT

TECHNICAL FIELD

This invention relates to the operation of gas turbine engines and particularly to computing the output power which such an engine may produce to thereby provide a measure of the "health" of the engine. More specifically, the present invention is directed to apparatus for providing, in response to sensed engine operating parameters and the ambient conditions, an indication of the power available from the engine and especially to a power availability measuring device wherein stored engine performance data is modified to take into account changes in the operating characteristics of the engine which occur over its service life. Accordingly, the general objects of the present invention are to provide novel and improved methods and apparatus of such character.

BACKGROUND ART

In the past, when it was desired to determine the "health" of a gas turbine engine, various engine operating parameters would be measured and recorded during a test flight by a maintenance crew. The recorded data would subsequently be employed to determine the health of the engine and, by way of example, whether turbine blade wear had resulted in a decrease in the maximum output power which could be produced. Such a measurement procedure is time consuming and expensive. Furthermore, knowledge that the maximum output power available from an engine had decreased by a small percentage did not help the pilot in determining the maximum power available under a specific anticipated flight condition.

Engine performance "maps", either supplied by the engine manufacturer or derived from data supplied by the manufacturer, could theoretically be used to predict the engine power available under varing operating conditions. Such predictions, however would not be sufficiently accurate since they would be predicated upon baseline curves which are themselves not sufficiently accurate over the full flight envelope. Further, since engine performance "maps" do not take into account reduced performance resulting from wear, they are of value only to maintenance crews.

The safety of operation of a gas turbine engine powered aircraft, and this is particularly true of rotary wing type aircraft, would be significantly enhanced if the pilot could be provided with information which would allow him to know, in advance of attempting to operate under a given set of flight conditions, the "health" of his engine and particularly the power available from the engine. This same information would be helpful in determining the most desirable time for performance of routine engine maintenance.

DISCLOSURE OF THE INVENTION

The present invention overcomes the above briefly discussed and other deficiencies of the prior art by providing a novel technique for providing an indication of the power available from a gas turbine engine under a given set of engine operating conditions. The present invention also encompasses apparatus for determining the "health" of a gas turbine engine. In accordance with the present invention baseline maps of corrected torque, corrected temperature and pressure ratio, as functions of corrected engine speed, are used to determine the maximum available engine power. The correction for engine to engine variations and engine deterioration is accomplished by adaptively updating the baseline maps continuosuly during on-line engine operation. The corrected data from the baseline maps is employed to compute, under the existing ambient and operating conditions, the maximum available output power. This maximum output power may be displayed to the pilot and/or employed, in a rotary wing aircraft utilization, to compute the power available to hover.

BEST MODE OF CARRYING OUT THE INVENTION

In order to compute the power available from a gas turbine engine, the present invention receives signals commensurate with a number of engine operating parameters which are provided by conventional engine instrumentation. These parameters comprise the following:

$T_2$—Engine inlet temperature which, in the case of a rotary wing aircraft, will also be the ambient temperature,
$P_2$—Engine inlet pressure,
$N_1$—Engine gas generator (compressor) speed,
$N_2$—Engine power turbine speed,
$T_5$—Engine operational gas temperature,
Q—Engine output torque, The present invention further receives, as input information, signals commensurate with the limiting values of certain engine operating parameters. These limiting values are as follows:

Q (Max)—Maximum allowable output torque,
$N_1$ (Gov Max limit)—Maximum permissable compressor speed,
$T_5$ (limit)—Maximum permissable value of gas stream temperature, As indicated at 10, the $T_2$ input signal is ratioed to standard day temperature in degrees Rankin to produce the $\theta$ signal employed by the remainder of the computation circuitry. The square root of this $\theta$ signal is obtained by, for example, applying the $\theta$ signal to a square root determining circuit 12. The $\theta$ signal is also delivered as the first input to a multiplier 14. The $\sqrt{\theta}$ signal from the square root determining circuit 12 is applied as a first input to a divider 16. The second input to divider 16 is the gas generator speed limit reference $N1_{(Gov\ Max\ Limit)}$. The divider 16 provides a first power available limit signal $N1_{(Gov\ Max\ Limit)}/\sqrt{\theta}$ which is a function of a maximum permissable gas generator speed. This first limit signal is applied as a first input to a lowest value selection gate 18.

Figure 1:
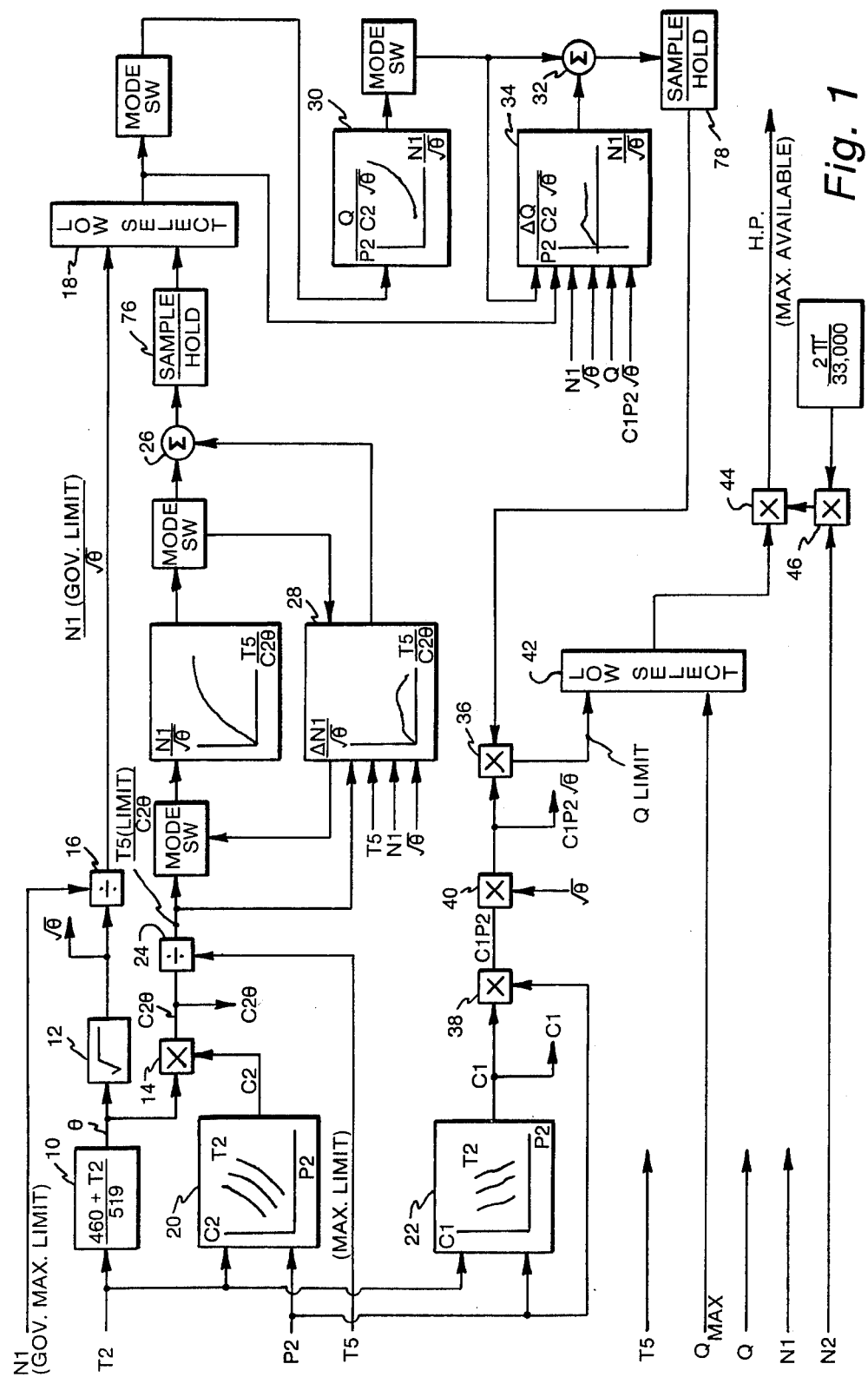
FIG. 1 is a functional block diagram of apparatus in accordance with the present invention in a engine power availability read-out mode.

The $T_2$ input signal, as well as the $P_2$ input signal, are employed to address a read only memory 20 which has stored therein values of a correction factor $C_2$. The correction factors, which will be the same for each engine of a given type, are obtained by employing the original (baseline) performance data for sea level and a standard day to calculate the theoretically available power and then comparing the calculated values with the actual measured power under various flight conditions. Use of memory 20, as well as a further similar memory 22, reduces the amount of memory capacity required to "fine tune" the computation of available power. That is, it will be inefficient to incorporate C1 and C2 in the baseline curves since to do so would require three dimensional mapping and thus very large memory capacity. As indicated in FIG. 1, the data stored in memories 20 and 22 will be in the form of a series of curves which are unique to different values of T2 and P2. It is also worthwhile at this point to note that the engine inlet pressure P2 may either be sensed or computed from a sensed value of P3 which is the compressor discharge pressure.

The correction factor C2 read from memory 20 is delivered as the second input to multiplier 14 which thus produces a $C2\theta$ signal. The output of multiplier 14 is applied to a second division circuit 24, and is also employed, in the manner to be described in the discussion of FIG. 2, in the adaptive on-line updating of the engine baseline maps. The second input to divider 24 will be the limiting value of T5. Thus, divider 24 will generate a signal commensurate with T5 (limit)/$C2\theta$. This signal is provided as the address input to a further memory 25 which has stored therein an engine performance map which will provide a measure of maximum gas generator speed, in units of $N1/\sqrt{\theta}$, as limited by temperature. Thus, upon addressing by the results of the division step 24, memory 25 will provide a second $N1/\sqrt{\theta}$ signal which is applied as a first input to a summing circuit 26. The output of divider 24 is also delivered to a correction function generator 28 which will be described in more detail below in the discussion of FIG. 2. Suffice it for the present to note that the correction function generator 28 provides an output signal which varies with the characteristics of the individual engine. The output of function generator 28 is also a function of the T5 limit signal which appears at the output of divider 24. The output of function generator 28 is delivered as the second input to summing circuit 26 whereupon the summing circuit will provide a $N1/\sqrt{\theta}$ signal which is accurate for the ambient conditions and the engine as it presently exists, this signal being applied as the T5 limit to lowest value selection gate 18.

It is to be noted that for maximum accuracy and utility, the correction function should be performed by a device having an addressable data storage medium which can be constantly updated and which will not lose its contents upon the shutoff of power. Such a storage device could, in its simplest form, be a magnetic tape or disc.

The $N1/\sqrt{\theta}$ limit signal selected by gate 18 is delivered as the address input to a further memory 30. Memory 30 contains the engine baseline map of corrected torque as a function of the corrected speed $N1/\sqrt{\theta}$ signal. Thus, a Q (Limit)/$P2C1\sqrt{\theta}$ signal will be read from memory 30 and applied as a first input to a summing circuit 32. The second input to summing circuit 32 will be derived from a further correction function generator 34 which is similar to and functions in the same manner as the above-described function generator 28. Thus, the output of summing circuit 32 will comprise the Q limit signal, as a function of $P2C1\sqrt{\theta}$, corrected for any variation from the baseline. This corrected Q signal is delivered as a first input to a further multiplier 36.

Both of the T2 and P2 input signals are delivered as inputs to the memory 22 which provides a C1 correction factor output signal from stored data which plots the correction factor C1 vs. P2 as a function of T2. The correction factor C1 is delivered as the first input to a multiplier 38. The second input to multiplier 38 is the P2 input signal. The output of multiplier 38 is applied as the input to a further multiplier 40. The second input to multiplier 40 is the signal commensurate with $\sqrt{\theta}$. The $C1P2\sqrt{\theta}$ output of multiplier 40 is applied as the second input to multiplier 36. Accordingly, the output of multiplier 36 will be indicative of the maximum available torque for the ambient conditions taking into account the existing conditions of the engine. This Q (Limit) signal is delivered as a first input to a further lowest value selection gate 42. The second input to gate 42 is a maximum torque reference signal $Q_{(Max)}$. The signal selected by gate 42 is delivered as a first input to multiplier 44 wherein it is multiplied by the product of the engine output shaft speed N2 and a constant, as provided by a multiplier 46, to convert the torque signal to units of horsepower.

Figure 2:
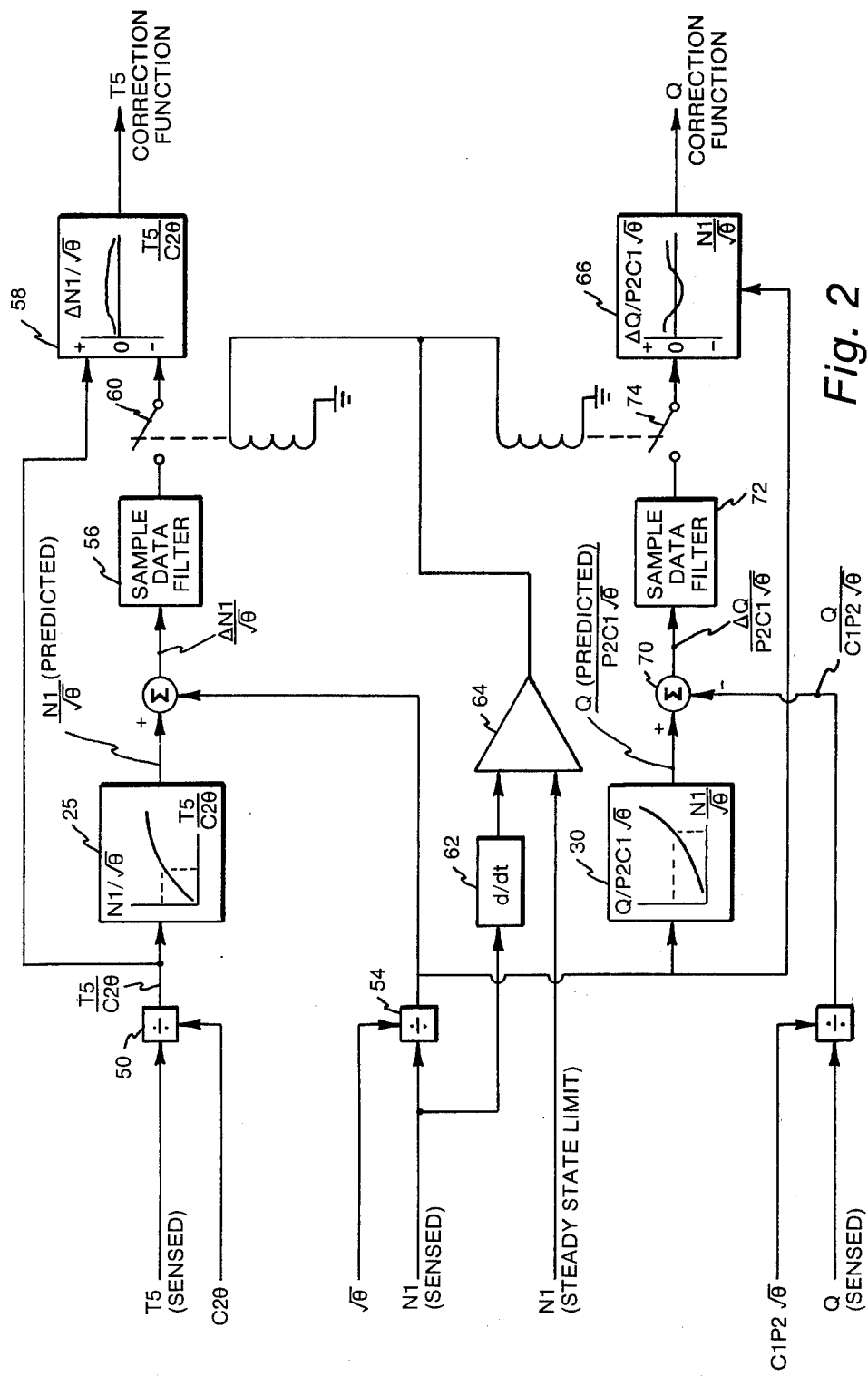
FIG. 2 is a functional block diagram which depicts the adaptive on-line "map" updating of the apparatus of FIG. 1, FIG. 2 depicting a portion of the apparatus of FIG. 1 in the read-in mode.

With reference now to FIG. 2, the manner in which the baseline maps stored in memories 25 and 34 are updated is shown. Thus, FIG. 2 constitutes a functional block diagram of a portion of the embodiment of FIG. 1 shown in the read-in mode. The signal commensurate with the actual sensed value of T5 and the $C2\theta$ signal from multiplier 14 are delivered to a divider 50. The output of divider 50 is employed to address memory 25 to thereby cause the read-out of $N1/\sqrt{\theta}$ from the baseline data. This baseline data signal is applied as a first input to a summer 52. The signal commensurate with the actual sensed gas generator speed N1 and the $\sqrt{\theta}$ signal from the square root deriving circuit 12 are delivered to a divider 54 which provides an output signal commensurate with the actual instantaneous value of $N1/\sqrt{\theta}$. The signal from divider 54 will be the second input to summer 52, whereupon the summer wll provide an error signal $\Delta N1/\sqrt{\theta}$. This error signal is applied to a sample data filter 56. The purpose of filter 56 is to eliminate sample data noise in the system. This is achieved by averaging a number of samples prior to incorporating the correction into the storage device 58 of function generator 28.

The output of filter 56 is delivered, via switch 60, as the data input to the storage device 58 correction function generator 28. The address input to storage device 58 is the same signal, i.e. the output of divider 54, employed to address memory 25. thus, during the read-in mode, data commensurate with differences between the baseline $N1/\sqrt{\theta}$ and actual $N1/\sqrt{\theta}$ signals will be stored in function generator 28 and will update data previously stored at the same identifiable storage locations in function generator 28. As described above in the discussion of FIG. 1, during the read-out mode the information stored in the memory of function generator 28 will be summed with the baseline data, thereby adaptively updating the baseline data for changes in engine performance.

The N1 signal is also differentiated, in a differentiator 62, to provide an N1DOT signal commensurate with the actual rate of change of gas generator speed. This signal is compared with an N1DOT steady state limit or reference signal in a comparator 64. Comparator 64 will provide an output signal indicative of whether the engine is operating under steady state conditions. The output of comparator 64 functions as the control input for switch 60. Accordingly, data for updating the baseline map will not be delivered to the storage device 58 of correction function generator 28 when the engine is accelerating or decelerating as indicated by a significant difference between the actual N1DOT and the N1DOT steady state limit.

It is to be noted that the operation of correction function generator 34 is substantially identical to that of correction function generator 28 as described immediately above. Thus, during the updating of the data in function generator 34 the output of divider 54 will function as the address input to memory 30 and to the storage device 66 of correction function generator 34. A Q signal commensurate with the actual measured value of torque will be divided, in a divider 68, by the output of multiplier 40. This will produce a $Q_{(sensed)}/P2C1\sqrt{\theta}$ signal which will be compared, in a summer 70, with the baseline data from memory 30. Any error signals, during steady state operation, will be employed to update the data in the storage device 66. Data will be delivered to storage device 66 via a sample data filter 72 and a switch 74. Switch 74 operates in the same manner as switch 60 in response to the output of comparator 64.

It may be seen from the above description that the corrected baseline data is adaptively updated beginning with initial engine operation and thus a very accurate prediction of engine power available, and thus engine health, is permitted. The available power predictions provided by the present invention take into account the degree by which the new engine may exceed minimum standards, i.e., engine-to-engine differences resulting from manufacturing tolerances, and engine deterioration.

Referring again to FIG. 1, it is to be noted that, during the updating of function generators 28 and 34, the last corrected values of the baseline information read from memories 25 and 30 will be temporarily stored in respective sample and hold circuits 76 and 78. Thus, data will always be present which will permit the determination of available torque.

While a preferred embodiment has been shown and described, various modifications and substitutions may be made thereto without departing from the spirit and scope of the invention. Accordingly, the invention has been described by way of illustration and not limitation.

I claim:

1. A method of determining the power which may be produced by a gas turbine engine, the engine having a compressor and power turbine and being instrumented to provide signals commensurate with a pluraltiy of operating parameters and limits, the method comprising the steps of:
    determining the maximum permissible engine gas generator speed for the existing engine inlet conditions;
    correcting the maximum permissible gas generator speed for deviation in performance of the engine from a predetermined normal;
    employing the corrected maximum permissible speed to determine the maximum torque which can be produced for the existing inlet conditions; and
    comparing the determined torque with the engine torque limit to ascertain the maximum obtainable torque.

2. The method of claim 1 further comprising the step of:
    correcting the determined maximum producible torque for deviation in performance of the engine from a predetermined normal.

3. The method of claim 2 wherein the step of determining the maximum torque which may be produced comprises:
    determining from stored data a second correction factor which is a function of the engine inlet pressure and temperature;
    employing the second correction factor and both the actual inlet pressure and temperature to calculate a torque modifier; and
    using the torque modifier to adjust the determined maximum torque as a function of the engine inlet conditions.

4. The method of claim 3 wherein the step of correcting the determined maximum torque which may be produced is performed prior to using the torque modifier to adjust the determination and comprises:
    employing the actual values of inlet temperature and speed to calculate a speed address signal during a read-in mode;
    using the speed address to look up the predicted present torque from predetermined information;
    comparing the predicted present torque with the actual torque;
    recording any difference between the actual and predicted torques in a location identified by the speed address; and
    combining recorded torque difference information with predetermined torque information which are found at locations having the same speed addresses during a read-out mode.

5. The method of claim 1 wherein the step of determining the maximum permissible gas generator speed comprises:
    determining a first correction factor which is a function of the engine inlet pressure and temperature;
    employing the first correction factor and both the actual inlet temperature and a limiting value of engine temperature to calculate an engine temperature limit for the existing inlet conditions; and
    using the calculated temperature limit as an address to look up the maximum permissible speed from predetermined information.

6. The method of claim 5 wherein the step of correcting maximum permissible speed comprises:
    employing the first correction factor and the actual values of inlet and an engine gas temperature to calculate a corrected gas temperature for the existing engine operating conditions during a read-in mode;
    using the calculated temperature for the operating conditions as an address to look up the predicted present operating speed from the predetermined information during the read-in mode;
    comparing the predicted present operating speed with the actual speed;
    recording any difference between the actual and predicted speeds in a location identified by an engine gas temperature; and
    combining the recorded difference information with predetermined information which are found at locations having the same engine gas temperature addresses during a read-out mode.

7. The method of claim 6 further comprising the step of:

correcting the determined maximum producible torque for deviation in performance of the engine from a predetermined normal.

8. The method of claim 7 wherein the step of determining the maximum torque which may be produced comprises:
   determining from stored data a second correction factor which is a function of the engine inlet pressure and temperature;
   employing the second correction factor and both the actual inlet pressure and temperature to calculate a torque modifier; and
   using the torque modifier to adjust the determined maximum torque as a function of the engine inlet conditions.

9. The method of claim 7 wherein the step of correcting the determined maximum torque which may be produced is performed prior to using the torque modifier to adjust the determination and comprises:
   employing the actual values of inlet temperature and speed to calculate a speed address signal during a read-in mode;
   using the speed address to look up the predicted present torque from predetermined information;
   comparing the predicted present torque with the actual torque;
   recording any difference between the actual and predicted torques in a location identified by the speed address; and
   combining recorded torque difference information with predetermined torque information which are found at locations having the same speed addresses during a read-out mode.

* * * * *